United States Patent Office 3,549,575
Patented Dec. 22, 1970

3,549,575
JOINT SEALANT COMPOSITION
Dana C. Payne, Redwood City, and Jack L. Chandler, Hayward, Calif., assignors to Frank D. Gaus, doing business as Superior Products Company, Oakland, Calif.
No Drawing. Continuation-in-part of application Ser. No. 535,004, Mar. 17, 1966. This application Apr. 25, 1969, Ser. No. 819,415
Int. Cl. C08c 11/70; C08f 45/52; C09d 3/24
U.S. Cl. 260—28.5                     13 Claims

ABSTRACT OF THE DISCLOSURE

A single component liquid hot pour type coal tar pitch vinyl chloride composition which is fluid prior to use and is subsequently heated and flowed into a concrete joint or the like where it forms an elastic adherent seal.

The invention relates to sealant materials for filling and sealing joints and relates, more particularly, to hot pour type of joint sealant composition for use in sealing joints in concrete or similar materials. This application is a continuation-in-part of application Ser. No. 535,004 filed Mar. 17, 1966 now abandoned, for Joint Sealant Composition.

Sealants are in widespread use for sealing joints between adjacent slabs of concrete such as are found in aircraft runways, taxiways, aprons, highways, city streets, and parking areas. One type of related hot pour sealant composition heretofore in use on a limited basis has been a composition comprising, coal tar and a minor proportion of a vinyl chloride (polyvinyl chloride—PVC) resin. Such a sealant composition is a heterogeneous mixture which is fluid prior to use and is subsequently heated, to disperse the resin, and flowed into a concrete joint where it forms an elastic adherent seal preventing the entry of foreign materials into the joint between the slabs. While this composition is a very effective and highly satisfactory concrete joint sealant once in place between the concrete slabs, it has been found to have one serious defect which has limited its commercial use. Coal tar vinyl chloride resin sealant compositions have been found to have an extremely short shelf life as a heterogeneous fluid and in fact, once mixed together, they will often gel within one day under normal storage conditions. An even shorter shelf life of the fluid mass can be expected if the composition is exposed to elevated storage temperatures.

The premature gelling of vinyl chloride resin and coal tar eliminates the principal feature of the sealant composition, its fluidity which allows uniform heat transfer, and ease of handling during heating and pouring into the concrete joint. Initial fluidity is essential, not only for ease of preparation and handling, but also, and most importantly, to prevent the formation of a three-dimensional network as a result of overheating of the sealant composition. It has been found that PVC-coal tar blends are highly reactive at elevated temperatures and will chemically combine, through the pitch constituent of coal tar, if overheated to produce a three-dimensional network that is no longer fluid and cannot be applied to concrete joints as intended. As will be understood, a gelled mass of coal tar and PVC is much more likely to experience uneven heat transfer, and as a result local overheating, than is a liquid composition. This is a very important reason for maintaining fluidity of such compositions for substantial periods of time. Therefore, the net result of the poor shelf life or storage stability of polyvinyl chloride coal tar heterogeneous fluid masses has been that these sealant compositions have been rejected by industry as being impractical for widespread application and use in the sealing of concrete joints.

Another prior art composition is that comprised of vinyl chloride resin and coal tar pitch and is what may be referred to as a two-component system. The polyvinyl chloride resin and the coal tar pitch are delivered as separate and stable components to the job site where the pitch is heated to a molten state to provide a hot liquid, and the resin is then blended in and the mixed heated product poured into the joint to be sealed. This composition has the advantage of permitting better heat control but a single liquid component system has many advantages over the two-component system, among others in providing precisely controlled blending of the ingredients and better quality control of end product due to problems associated with handling of multiple components at the job site. However, prior to applicants' invention, no single component liquid system was commercially available due to the very short shelf life involved. Accordingly, an object of the present invention is to provide a single liquid component system for producing a vinyl chloride resin coal tar pitch joint sealant and which is produced and furnished as a single liquid component which has a long and dependable shelf life.

Another object of the present invention is to provide a joint sealant of excellent quality and which is easier to prepare and to handle prior to pouring into the concrete joint.

The invention possesses other objects and features of advantage, some of which of the foregoing will be set forth in the following description of the preferred form of the invention. It is to be understood, however, that variations in the description and examples may be adopted within the scope of the invention.

The foregoing objective has been attained by the discovery of two factors. The first of these is in the selection of a fluidizing or plasticizing agent for providing a liquid coal tar pitch component. Applicants have discovered that the limited shelf life of the previously tried liquid coal tar vinyl chloride composition is due to the presence in the coal tar of certain multi-ring aromatic compounds, notably naphthalene-based compounds, and that satisfactory shelf life could be obtained by limiting the amount of such compounds to not more than about fourteen percent (14%) of the pitch or pitch fraction. The second factor, contributing also to the overall quality of the sealant, is the selection of a particular fraction or fractions of the coal tar pitch. Normally bituminous coal tar pitch is a solid. However, applicants have discovered that there is a cut or fraction of the pitch lying between about 355° C. and 450° C. which is liquid, although fractions lying on both sides of this liquid fraction are solid. For example, the lower boiling point fraction, identified herein as fraction C, boiling between 315° C. and 355° C., is solid; and the higher boiling point fraction, identified herein as the E-pitch fraction, boiling above 450° C., is also solid. Applicants have found that this unique liquid pitch fraction, lying between about 355° C. and 450° C. and herein referred to as D-pitch fraction, provides an excellent liquid composition with PVC and exhibits very good shelf life.

Accordingly, if D-pitch fraction is used, no additional plasticizer or liquefying agent is required and, consequently, the problem of deleterious multi-ring compounds is avoided, since such compounds are found only in substantial quantity in the coal tar fractions boiling below 355° C., or the threshold of the D-pitch fraction. Also, because of the liquid characteristic of the D-pitch fraction, it is feasible to add in some of the solid E-pitch fraction. In such case, the D-pitch fraction will solubilize the E-pitch fraction and minimize the amount of additional plasticizer which may be required. One of the preferred examples of the present invention uses a pitch blend composed of about seventy-five percent (75%) D- pitch fraction and twenty-five percent (25%) E-pitch fraction.

The aforementioned multi-ring aromatic compounds which include the substituted derivatives thereof are those having fewer than four rings with each ring being joined to another ring by at least two carbon atoms and having a boiling point below about 355° C. These multi-rin aromatic compounds are found in the lighter coal tar fractions; that is, those having a boiling point below about 355° C. Particularly objectionable are naphthalene-based compounds of varying degrees and types of substitution which are found principally in coal tar fractions having a boiling point range of about 200° C. to 315° C. The higher boiling point coal tar fraction C contains in the main aromatic three-ring structures anthracene, carbazol and, as a principal constituent, phenanthrene. As with the two-ring naphthalene compounds, the three-ring compounds cause instability but to a lesser degree, and much higher percentages may be tolerated. For practical purposes in the compounding of the sealant of the present invention, the objectionable lower molecular weight aromatic compounds are naphthalene and substituted naphthalene compounds having a boiling point of below about 315° C. While it has been found that such compounds should be confined to no more than about fourteen percent (14%) of the weight of the pitch fraction, it has been found preferable, and a substantial resultant increase in the shelf life of the composition accrues, when the entire composition contains no more than about six percent (6%) of the undersirable lower molecular weight aromatic compounds based on pitch fraction content.

Where a fluidizing or plasticizing agent is required to provide a fluid pitch component for mixing with the polyvinyl chloride, a number of materials are available and may be used. The plasticizer is not critical to the present invention except in the limitation of the naphthalene-based compounds as above discussed. It must be compatible with the combination of polyvinyl chloride and pitch after heating and may be chosen from, but not limited to, the classes of high boiling substituted phthalates, adipates, phosphates, and petroleum-derived plasticizers, to mention a few, or suitable combinations thereof, Since plasticizers and the characteristics imparted by their use are well known to those skilled in the art of PVC technology, any further definition is not necessary. In addition, the plasticizer should not be a true solvent for the PVC resin at ambient temperatures such that gelation occurs without heat. An example of a plasticizer which has been found to be highly satisfactory in the composition of the present invention is dibutyl phthalate.

The polyvinyl chloride resins employed in the present invention may be a homopolymer or copolymer such that when admixed with pitch fraction or plasticized pitch in the amount of two to twenty-five percent (2% to 25%) parts by weight of the total mixture, the mixture will be fluid, and following a heating (fluxing), at approximately 200° to 350° F., and cooling to ambient temperatures will form an elastic solid. The preferred vinyl chloride resin is commercially available as a high molecular weight homopolymer with the designation of "dispersion type" and is most usually in a powder form with average particle size below 15 microns. Other copolymers of PVC are well known in the art as being suitable for the sealant of the present invention and include such others as a commercial copolymer of vinyl chloride and maleic ester. Vinyl chloride resins with larger particle sizes are also suitable for the present invention.

The exact ratio of vinyl chloride resin to plasticized pitch will depend upon the desired end product and include consideration of a variety of factors such as the particle size of the resin, molecular weight of the resin, boiling range of the pitch, and extent of plasticization. The preferred range of vinyl chloride resin of the present invention is five to fifteen percent (5% to 15%) by weight of the entire composition, the remainder of the composition comprising pitch fraction or plasticized pitch, and fillers and stabilizers, if desired; with the plasticized pitch and/or pitch fraction constituting the major portion of the composition, excluding filler.

To illustrate the advantages of the instant invention and the serious limitations of prior art compositions, the following examples may be cited.

TABLE 1

|  | Approximate equivalent boiling range ° C. at atmospheric pressure | Examples Compounds (All parts by weight) | | | | | | |
|---|---|---|---|---|---|---|---|---|
|  |  | 1 | 2 | 3 | 4 | 5 | 6 | 7 |
| PVC homopolymer resin (average particle size, 15 microns) |  | 8 | 8 | 8 | 8 | 8 | 8 | 8 |
| Ca(OH)² (Filler) |  | 22 | 22 | 22 | 22 | 22 | 22 | 22 |
| Aromatic petroleum plasticizer |  |  | 70 | 17.5 | 17.5 | 17.5 | 0 | 40.5 |
| Coal Tar Fractions:[1] |  |  |  |  |  |  |  |  |
| A (liquid) | 200 to 235 |  |  | 52.5 |  |  |  |  |
| B (liquid) | 235 to 315 |  |  |  | 52.5 |  |  |  |
| C (solid) | 315 to 355 |  |  |  |  | 52.5 |  |  |
| D-Pitch fraction (liquid) | 355 to 450 |  |  |  |  |  | 70 |  |
| E-Pitch (solid) | 450 up |  |  |  |  |  |  | 29.5 |
| Coal Tar RT-5 | 200 up | 70 |  |  |  |  |  |  |
| Viscosity-poise ² original |  | 130 | 210 | 0.9 | 17 | 25 | (3) | (3) |
| After storage at 122° F.: |  |  |  |  |  |  |  |  |
| 1 day |  | (4) | 170 | (4) | (4) | 145 | 1,780 | 6,080 |
| 2 days |  |  | 165 |  |  |  | 1,670 | 3,770 |
| 3 days |  |  | 160 |  |  |  | 1,630 | 4,100 |
| 4 days |  |  |  |  |  | (4) |  |  |
| 5 days |  |  |  |  |  |  |  | 5,820 |
| 6 days |  |  | 155 |  |  |  | 1,630 |  |
| 8 days |  |  |  |  |  |  |  | 4,600 |
| 9 days |  |  |  |  |  |  | 2,080 |  |
| 23 days |  |  | 170 |  |  |  |  |  |

[1] Bituminous coal source.
[2] Measured at 77–80° F., except Examples 5 and 7, measured at 110–115° F. due to very high viscosity at 77–78° F.
[3] Not measured.
[4] Gel.

E-pitch, indicated in the above Table 1 as a solid, is the pitch residue, or a portion thereof, taken above the D-pitch fraction and having a boiling point of about 450° C. and up. This pitch has a softening point in the range of about 92° C. to 102° C. cube in air; and a range of about 95° C. to 100° C., ring and ball.

The compounds of Table 1 were made in the conventional manner by mixing at room temperature; however, those containing a blend of coal tar fraction and aromatic petroleum plasticizer were made from the previously heated and cooled blend, such procedure being used to insure uniformity. All are heterogeneous mixtures of PVC.

The viscosity of each compound was measured periodically to determine stability during storage. Compound of Example 1 is typical of the prior art and is very unstable in storage, as shown by gelation in one day. Compound of Example 2 is not a sealant but merely contains a high boiling, compatible aromatic petroleum plasticizer and is included to show that this plasticizer has negligible influence on storage stability and may be used to blend with coal tar fractions without adversely influencing the composition.

Compounds of Examples 3 through 7 illustrate the effect of various coal tar and pitch fractions on storage stability with polyvinyl chloride. It should be understood that distillation is not exact and that there can be some overlap among fractions. Also, distillation of coal tar under vacuum can result in structural differences from atmospheric pressure distillation. However, for the purpose intended, that is to demonstrate the advantages accruing from elimination of lower molecular weight aromatic compounds, the procedure is adequate and reproducible.

Compounds of Examples 3 and 4 result in rapid gelation on storage similar to that of Example 1. Compound of Example 5 is more stable than 3 or 4, but is considered marginally stable as gelation occurs in four days which limits its commercialization.

Compound of Example 6 uses the aforementioned D-pitch, fluid at room temperature, and which affords excellent stability.

Table 1 clearly demonstrates that there is far more stability with the use of pitch or pitch fractions than was present in the coal tar fractions. Results with compound 7 are rather erratic due to the very high viscosity and difficulty in measuring viscosity at elevated temperatures. The significant result observed is that there was no gelation after many days' storage, which indicates the feasibility of using E-pitch with a suitable plasticizer. Accordingly, a wide range of combinations of pitch fractions D and E can be used. The higher the proportion of D-pitch, the less the need for plasticizer. Since the sealant is the reaction product of pitch, increasing the proportion of D-pitch increases the total pitch content of the composition and hence the quality of the sealant. The essential combination of the present invention is a coal tar pitch selected from the group consisting of D-pitch and E-pitch and a plasticizer as required containing a minimum amount of multi-ring aromatic compounds, as above described. Minor amounts of other coal tar components as shown in Table 1 may be added within the general limitations herein discussed.

It has been found that a compound similar to that shown in Table 1, Example 6, but using fourteen percent (14%) of petroleum-derived two-ring compounds (methyl and dimethyl naphthalenes) based on pitch fraction D results in an initial viscosity at room temperature of 20 poises, a viscosity of 160 poises after three days' storage at 122° F., and 8,850 poises after six days' storgae. The destabilizing effect of methyl-substituted naphthalenes is thus evident, and these are present in the lighter coal tar fractions and elsewhere. Accordingly, the critical contaminating compounds which can be tolerated are independent of the source of such compounds; and the quantity will depend upon the specific compounds and conditions of storage to be met. In general the quantity of naphthalene and substituted naphthalene compounds should be below about fourteen percent (14%) of the pitch. Higher molecular weight multi-ring aromatics such as are found in fraction C can be tolerated in greater amounts but in general should be below that shown in Example 5.

EXAMPLE 8

A pitch blend composed of seventy-five percent (75%) D-pitch fraction and twenty-five percent (25%) E-pitch fraction has proven excellent and fluidity can be readily achieved using some additional plasticizer which should be substantially free of the objectionable multi-ring compounds above discussed. Such a single component liquid hot pour type joint sealant composition is set forth in the following example.

The following ingredients may be blended at room temperature.

| Materials: | Percentage parts by weight |
|---|---|
| Vinyl chloride resin (PVC of Table 1) | 8 |
| Filler (Ca(OH)$_2$) | 22 |
| Pitch blend homogeneous blend using heat of 75% D-pitch fraction, 25% E-pitch fraction | 56 |
| Dibutyl phthalate | 14 |
| | 100 |

This compound is fluid and stable for long periods of time, as may be seen in Table 2.

TABLE 2
[Sealant of Example 8]

| Days' Storage at 122° F | 1 | 3 | 6 | 13 | 20 | 27 | 34 |
|---|---|---|---|---|---|---|---|
| Viscosity-poise, measured at 77–78° F | 210 | 195 | 199 | 240 | 320 | 570 | 1,670 |

The remarkable storage stability of the products of the present invention when compared with the coal tar PVC sealant of the prior art compound of Example 1 is apparent. Both result in similar final properties after fluxing at elevated temperatures (about 200° to 350° F.) and pumping the homogeneous liquid mass in place between adjacent concrete sections and cooling to form an adherent, resilient, water and fuel resistant joint seal of outstanding quality. Thus, a practical and highly useful single component liquid hot pour type coal tar pitch polyvinyl chloride joint sealant has been made practical and is for the first time undergoing widespread use.

What is claimed is:

1. A single component liquid hot pour type joint sealant composition comprising, about 2 to 25% vinyl chloride resin, and a liquid coal tar pitch component consisting essentially of a pitch fraction having a boiling point of between about 355° C. and about 450° C.

2. A composition as defined in claim 1, and a pitch fraction having a boiling point of above about 450° C., said last named fraction constituting up to about 25% of the total pitch fractions.

3. A composition as defined in claim 2, and a pitch fluidizing agent containing not more than about 14% by weight based on said pitch fractions of naphthalene and substituted naphthalene compounds which have a boiling point of below about 315° C.

4. A composition as defined in claim 3, wherein said agent contains not more than about 6% by weight based on said pitch fractions of naphthalene and said substituted naphthalene compounds.

5. A single component liquid hot pour type joint sealant composition comprising, about 2% to 25% vinyl chloride resin and a liquid coal tar pitch component comprising a coal tar pitch selected from the group consisting of pitch fraction having a boiling point of approximately 355% C. to 450° C., and a pitch fluidizing agent as required to produce fluidity containing not more than about 14% by weight based on said pitch of naphthalene and substituted naphthalene compounds which have a boiling point of below about 315° C.

6. A composition as defined in claim 5, wherein said substituted naphthalene compounds are methyl-substituted naphthalenes.

7. A composition as defined in claim 5, wherein said plasticizer contains not more than about 6% based on said pitch of said naphthalene and substituted naphthalene compounds.

8. A composition as defined in claim 3, and comprising, the following ingredients and approximate proportions:

| | Parts by weight |
|---|---|
| Vinyl chloride resin | 8 |
| Filler | 22 |
| Coal tar pitch fraction, boiling between about 355° C. and 450° C. | 42 |
| Coal tar pitch fraction, boiling above about 450° C. | 14 |
| Pitch fluidizing agent | 14 |
| | 100 |

9. A composition as defined in claim 8, wherein said plasticizer is dibutyl phthalate.

10. The method of producing a stable single component liquid composition adapted upon subsequent heating to form a coal tar pitch vinyl chloride resin joint sealant compound, comprising, mixing vinyl chloride resin and a liquid coal tar pitch component including pitch and fluidizing said component by selecting at least about 75% of said pitch a liquid pitch fraction having a boiling point of between about 355° C. and 450° C.

11. The method as defined in claim 10, and supplementing the fluidizing action of said liquid pitch fraction with a fluidizing agent containing not more than about 14% by weight based upon said pitch of naphthalene and substituted naphthalene compounds boiling below about 315° C.

12. The method of producing a stable single component liquid composition adapted upon subsequent heating to form a coal tar pitch vinyl chloride resin joint sealant compound comprising, mixing at a temperature below fluxing vinyl chloride resin and a liquid coal tar pitch component comprising a coal tar pitch selected from the group consisting of pitch fraction having a boiling point of approximately 355° C. to 450° C. and a pitch fraction having a boiling point above 450° C. and a plasticizer as required to produce fluidity and containing not more than about 14% by weight based on said pitch of naphthalene and substituted naphthalene compounds having a boiling point of below about 315° C.

13. The method as defined in claim 12, wherein said plasticizer contains not more than about 6% based on said pitch of said naphthalene and substituted naphthalene compounds.

References Cited

UNITED STATES PATENTS

| | | | |
|---|---|---|---|
| 2,715,615 | 8/1955 | De Bell et al. | 260—28.5D |
| 2,883,354 | 4/1959 | Sperling | 260—28.5D |
| 3,230,192 | 1/1966 | Mazurk | 260—28.5D |

ALLAN LIEBERMAN, Primary Examiner

S. L. FOX, Assistant Examiner

U.S. Cl. X.R.

106—279

UNITED STATES PATENT OFFICE
CERTIFICATE OF CORRECTION

Patent No. 3,549,575   Dated   December 22, 1970

Inventor(s) Dana C. Payne et al.

It is certified that error appears in the above-identified patent and that said Letters Patent are hereby corrected as shown below:

Column 3, line 72, change "of," to --of.--.

Column 4, Table 1, change "$Ca(OH)^2$" to --$Ca(OH)_2$--.

Column 5, line 59, change "storgae" to --storage--.

Column 6, line 66, change "355% C." to --355° C.--.

Signed and sealed this 6th day of April 1971.

(SEAL)
Attest:

EDWARD M. FLETCHER, JR.   WILLIAM E. SCHUYLER, JR.
Attesting Officer         Commissioner of Patents